United States Patent [19]
Colley

[11] Patent Number: 5,883,595
[45] Date of Patent: Mar. 16, 1999

[54] METHOD AND APPARATUS FOR MITIGATING MULTIPATH EFFECTS AND SMOOTHING GROUNDTRACKS IN A GPS RECEIVER

[75] Inventor: Jaime B. Colley, Laguna Niguel, Calif.

[73] Assignee: Rockwell International Corporation, Newport Beach, Calif.

[21] Appl. No.: 929,694

[22] Filed: Sep. 15, 1997

[51] Int. Cl.⁶ .............................. G01S 5/02; H04B 7/185
[52] U.S. Cl. ........................... 342/357; 701/213; 375/350
[58] Field of Search ............................. 342/357; 701/213; 375/207, 350; 455/65, 213

[56] References Cited

U.S. PATENT DOCUMENTS 5,416,712  5/1995  Geier et al. .
5,590,043  12/1996  McBurney .
5,615,232  3/1997  Van Nee .

Primary Examiner—Thomas Tarcza
Assistant Examiner—Dao L. Phan
Attorney, Agent, or Firm—James P. O'Shaughnessy; William C. Cray; Susie H. Oh

[57] ABSTRACT

A method of smoothing Kalman Filter position states forming a "groundtrack" in a receiver used in a satellite based positioning system (e.g. GPS). In such systems, data pairs including an incoming value and a "raw" reliability estimate (e.g. a standard deviation) are normally fed directly to the Kalman Filter. The Kalman Filter computes the resultant and an overall uncertainty estimate by applying a "weight" to each successive incoming value based on its reliability. The Kalman Filter also estimates incoming values based on past values.

The method involves the unique steps of replacing the raw reliability with a "modified" reliability if the incoming value is too far from the estimate in view of an adjustable limit envelope defined by the current uncertainty estimate and reliability value. If the difference between what we get and what we expect is small, then the reliability value is passed without modification. If the difference is large, however, then we decrease the reliability value to tell the Kalman Filter that the value is less reliable. In other words, we "de-weight" implausible values. The modified reliability value is preferably scaled or decreased in proportion to the amount by which the square of the incoming value is outside of the limit envelope. This even minimizes the effect of values that are very strong (have high "reliability"), but still very wrong, and thereby smoothes the resultants produced by the Kalman Filter.

26 Claims, 2 Drawing Sheets

METHOD AND APPARATUS FOR MITIGATING MULTIPATH EFFECTS AND SMOOTHING GROUNDTRACKS IN A GPS RECEIVER

BACKGROUND OF THE INVENTION

1. Field of the Invention

The present invention relates generally to satellite based positioning systems (SATPS) such as the Global Positioning System (GPS).

2. Description of Related Art

A SATPS receiver generally determines its positions by triangulating its Line of Sight (LOS) range to several satellites or space vehicles. A GPS receiver, for example, computes a 4-dimensional solution involving latitude, longitude, altitude, and time using the LOS ranges to as few as four satellites. The accuracy of the solution is a direct function of the accuracy of the range measurements.

SATPS receivers are growing rapidly in popularity and application. GPS receivers, for example, are now common in aviation, marine, and terrestrial applications. An increasingly common terrestrial application for GPS receivers is in automobiles. In the automotive context, the vehicle's location is typically displayed on an electronic display of a street map. It is vital in this context, therefore, to provide the driver with continuously updated position solutions, collectively called a "ground track," that accurately track the vehicle's movement from one moment to the next. From a usability point of view, the groundtrack should only reflect the vehicle's movement. In fact, experience shows that consumers consider groundtrack fidelity as one of the most important criteria in choosing a receiver. It is extremely important, therefore, that the groundtrack displayed on the GPS receiver's electronic map not have spurious jumps, stair steps, spikes, jigs, or jogs that are unrelated to the vehicle's actual path.

There are a number of factors, however, which may cause discontinuities in the position solutions which make up the groundtrack on the display of an automotive SATPS receiver.

One given source of position solution discontinuities is "Selective Availability" (SA) which is used to restrict the accuracy of civilian GPS receivers to roughly 100 meters 1-sigma for purposes of national security. The Department of Defense (DOD) implements SA by purposely injecting error into the satellite range signals.

Another common source of position solution discontinuities is "multipath," the phenomenon where the main LOS signal from a given satellite reaches the GPS receiver's antenna and is followed by additional "copies" due to reflection from nearby objects, such as buildings or cliffs. The multipath effect is particularly troublesome for automotive receivers because they are frequently used in cities and surrounded by tall buildings. This environment is sometimes called an "urban canyon" due to the canyon-like setting it resembles. Regardless of source, Multipath can be a very vexing problem because the additional signals may be very strong, but very wrong.

Yet another source of position solution discontinuities is the fact that the SATPS receiver may see a different constellation of satellites from one moment to the next. If the GPS receiver is in motion in an urban canyon environment, for example, individual satellites may become blocked and unblocked by nearby buildings. There is always some degree of error in a position solution based on one group of satellites. If the position solution is suddenly based on another group, the result may be a jump or discontinuity in position relative to the solution computed with the first group. This will, of course, cause visual groundtrack discontinuities on the receiver's display.

Other approaches to groundtrack smoothing known to this inventor, such as those based on Digital Signal Processors, are overly complicated and relatively expensive.

There remains a need, therefore, for a simple, cost effective method of smoothing resultant values in Kalman Filter systems for use in, for example, mitigating multipath effects and smoothing groundtracks in a mobile SATPS receiver.

SUMMARY OF THE INVENTION

In a first aspect, the invention may be regarded as A method of smoothing discontinuities in a series of resultant states in a system of the type that uses a Kalman Filter to statistically derive the resultant states along with corresponding uncertainty estimates based on a succession of incoming data pairs comprising measurement values and corresponding reliability estimates. The Kalman Filter uses the reliability estimate in order to establish a weight for the measurement value. Accordingly, the method comprises the steps of: establishing a limit value based on the uncertainty estimate of the resultant state; comparing a first comparison value based on the measurement value with a second comparison value based on the limit value; setting a modified reliability value if the first comparison value is greater than the second comparison value; and providing the modified reliability value to the Kalman Filter in lieu of the reliability estimate in order to de-weight the corresponding measurement value.

In a second more specific aspect, the invention may be regarded as a method of smoothing discontinuities in a series of resultant states (e.g. position or velocity) in a satellite based positioning system that uses a Kalman Filter to statistically derive the resultant states along with corresponding uncertainty estimates based on a succession of incoming data pairs comprising pseudoranges and corresponding reliability estimates. In this case, the method comprises the steps of: establishing a limit value based on the uncertainty estimate of the resultant state and the reliability estimate of the pseudorange; comparing a first comparison value based on the pseudorange with a second comparison value based on the limit value; setting a modified reliability value if the first comparison value is greater than the second comparison value; and providing the modified reliability value to the Kalman Filter in lieu of the reliability estimate in order to de-weight the corresponding pseudorange.

In a third even more specific aspect, the invention may be regarded as a method of smoothing discontinuities in position estimate solutions in a satellite positioning system (SATPS) receiver that receives a plurality of SATPS signals from a plurality of satellites and uses a Kalman Filter to update a current position estimate ($\hat{x}$ $\hat{y}$ $\hat{z}$). In this case, the method comprises the steps of: determining a new pseudorange $\rho_n$ and a corresponding new standard deviation $\sigma_{\rho_n}$ based on the SATPS signal from an $n^{th}$ one of the plurality of satellites; calculating a measurement residual $\Delta\rho_n$ between the new pseudorange $\rho_n$ and an a priori pseudorange estimate $\hat{\rho}_n$ received from the Kalman Filter; calculating a pseudorange limit $\rho_{LIMIT}$ by adding a variance of the current position estimate $\sigma_{POS}^2$ to a variance of the new pseudorange $\sigma_{\rho_n}^2$; comparing the square of the measurement residual $\Delta\rho_n^2$ to the pseudorange limit $\rho_{LIMIT}$ which defines a permissible value envelope; setting a variably weighted variance value $VAR_{\rho n}$ for use with the new pseudorange $\rho_n$; and filtering the measurement residual $\Delta\rho_n$ and the variably weighted variance value $VAR_{\rho n}$ with the Kalman Filter to produce a next position estimate $(\hat{x}\ \hat{y}\ \hat{z})$, a standard deviation of the next position estimate $\sigma_{POS}$ and a next a priori pseudorange estimate $\hat{\rho}_n$ for use in acting upon and potentially de-weighting the effect of a next pseudorange $\rho_n$ and a corresponding standard deviation $\sigma_{\rho n}$ from the $n^{th}$ one of the plurality of satellites. Significantly, in the above setting step, if the square of the measurement residual $\Delta\rho_n^2$ is within the permissible value envelope defined by the pseudorange limit $\rho_{LIMIT}$, the variably weighted variance value $VAR_{\rho n}$ is set equal to the variance of the new pseudorange $\sigma_{\rho n}^2$ and, if the square of the measurement residual $\Delta\rho_n^2$ exceeds the permissible value envelope defined by the pseudorange limit $\rho_{LIMIT}$, the variably weighted variance value $VAR_{\rho n}$ is set equal to the standard deviation of the new pseudorange $\sigma_{\rho n}$ plus a scaling constant "K" times the difference between the square of the measurement residual $\Delta\rho_n^2$ and the pseudorange limit $\rho_{LIMIT}$. This results in de-weighting the effect of the new pseudorange $\rho_n$, without ignoring it altogether.

In a fourth aspect, the invention may be regarded as an improved receiver for satellite based positioning where such receiver has a Kalman Filter that statistically derives a succession of position states along with corresponding uncertainty estimates based on a succession of incoming pseudoranges and corresponding reliability estimates which the Kalman Filter uses in order to establish a weight for the pseudoranges. In such case, the improvement comprises means for establishing a limit value based on the uncertainty estimate of the position state and the reliability estimate of the pseudorange; means for comparing a first comparison value based on the pseudorange with a second comparison value based on the limit value; means for setting a modified reliability value if the first comparison value is greater than the second comparison value; and means for providing the modified reliability value to the Kalman Filter in lieu of the reliability estimate in order to de-weight the corresponding pseudorange.

BRIEF DESCRIPTION OF THE DRAWINGS

The just summarized invention can be best understood with reference to the following description taken in view of the drawings of which.

DETAILED DESCRIPTION OF THE PREFERRED EMBODIMENTS

The method of the present invention is described with respect to a satellite based positioning system and, more particularly, with respect to GPS. It should be understood, however, that the method may be used to smooth the computed values in any system which uses a Kalman Filter to update such computed values on the basis of continuously received values and corresponding reliability estimates.

Figure 1:
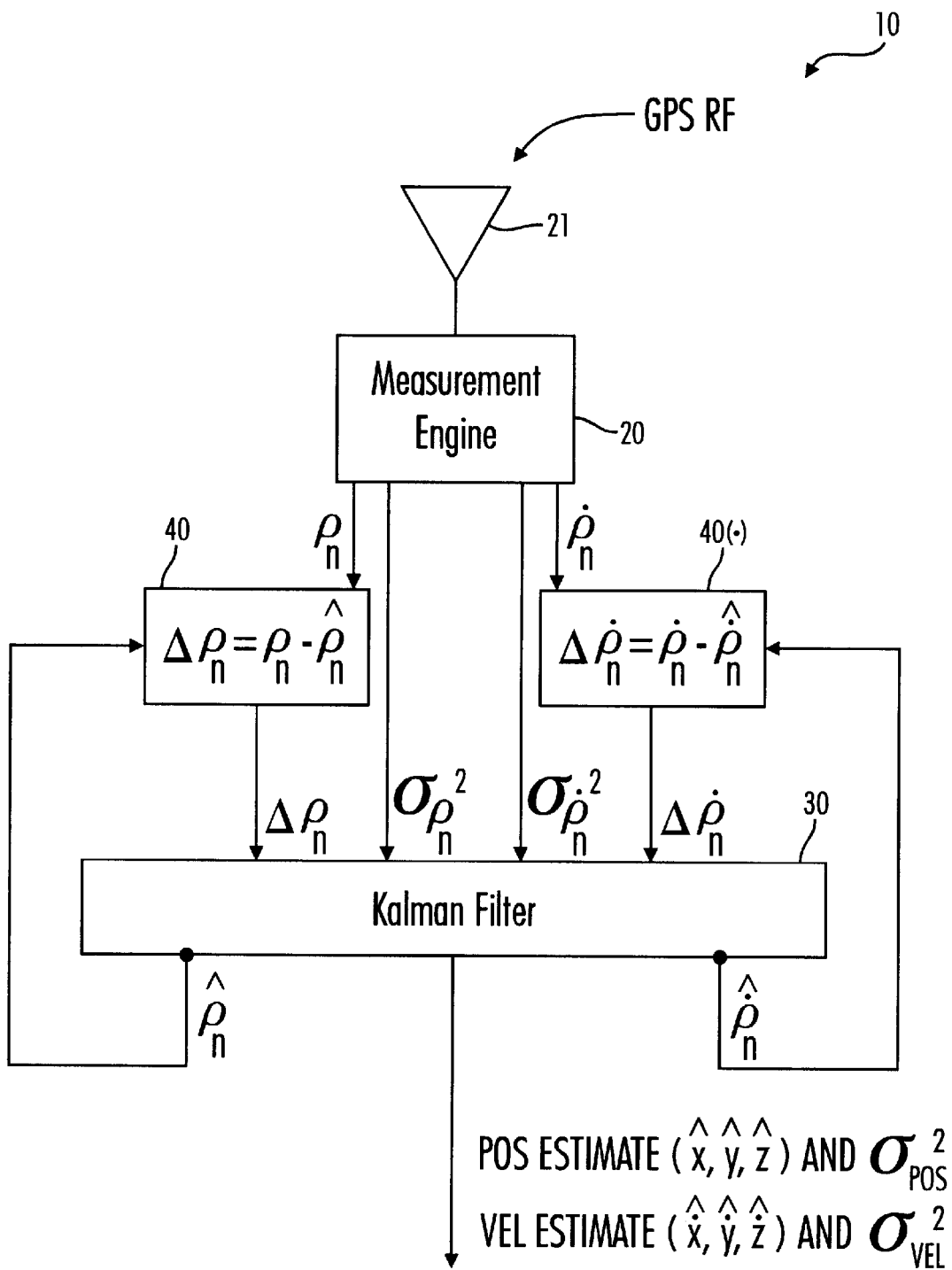
FIG. 1 is a simplified block diagram of a conventional SATPS receiver.

FIG. 1 is a simplified block diagram of a conventional GPS receiver 10 having a "measurement engine" 20 and a Kalman Filter 30. The measurement engine 20 receives RF signals from a plurality of orbiting satellites via an antenna 21 and the Kalman Filter 30 produces a series of position estimates $(\hat{x}\ \hat{y}\ \hat{z})$, velocity estimates $(\dot{\hat{x}}\ \dot{\hat{y}}\ \dot{\hat{z}})$, and error estimates corresponding to the position and velocity states $\sigma_{POS}^2\ \sigma_{VEL}^2$.

The construction of the measurement engine 20 varies from application to application and does not form a critical part of the present invention. Generally, however, the measurement engine 20 contains the analog electronics (e.g. preamplifiers, amplifiers, frequency converters, etc.) needed to pull in the RF signal, and further includes a code correlator for detecting a particular GPS code corresponding to a particular satellite. The measurement engine 20 estimates the line of sight (LOS) range to a detected satellite using a local, onboard GPS clock and data from the satellite indicating when the satellite code was transmitted. The LOS ranges determined this way are called "pseudoranges" because they are only estimates of the real range based on the local detection time.

In more detail, the measurement engine 20 generates pseudoranges $\rho_n$ and time derivative pseudoranges or pseudorange rates $\dot{\rho}_n$ based on the code detection corresponding to an "$n^{th}$" one of a plurality of satellites. The measurement engine 20 also generates corresponding reliability indicators or standard deviations squared $\sigma_{\rho n}^2$, $\sigma_{\dot{\rho}} n^2$ based primarily on the detected signal to noise ratio (SNR).

As further shown in FIG. 1, the conventional Kalman Filter 30 also provides a priori estimates or expected values for the incoming pseudorange $\hat{\rho}_n$ and pseudorange rate $\hat{\dot{\rho}}_n$. The measurement estimates $\rho_n$, $\dot{\rho}_n$ are provided, respectively, to the difference blocks 40, 40(·). More specifically, the difference blocks 40 and 40(·) receive the incoming measurements $\rho_n$, $\dot{\rho}_n$ from the measurement engine 20 and the measurement predictions $\hat{\rho}_n$, $\hat{\dot{\rho}}_n$ from the Kalman Filter 30 and produces difference values or measurement residuals $\Delta\rho_n$, $\Delta\dot{\rho}_n$ that represent how far the current measurement is from the expected measurement, where:

$\Delta\rho_n = \rho_n - \hat{\rho}_n$ in block 40; and $\Delta\dot{\rho}_n = \dot{\rho}_n - \hat{\dot{\rho}}_n$ in block 40(·).

The residuals $\Delta\rho_n$, $\Delta\dot{\rho}_n$ are then passed to the Kalman Filter 30, along with the reliability indicators $\sigma_{POS}^2$, $\sigma_{VEL}^2$, so that the Kalman Filter 30 may calculate new position estimates $(\hat{x}\ \hat{y}\ \hat{z})$ and velocity estimates $(\dot{\hat{x}}\ \dot{\hat{y}}\ \dot{\hat{z}})$.

A problem with the conventional GPS receiver 10 of FIG. 1 is that the position and velocity estimates may suffer from discontinuities given measurements $\rho_n$, $\dot{\rho}_n$ that are erroneous but are established with signals having a high SNR such that the reliability indicators $\sigma_{\rho n}^2$ or $\sigma_{\dot{\rho}} n^2$ indicate the signals are of high reliability. In lay terms, this can be viewed as a signal that is really strong, but really wrong. As explained in the background section, such inconsistent measurements can occur due to disturbing factors such as the blocking and unblocking of one or more satellites, multipath, and SA. In the conventional GPS receiver 10 of FIG. 1, however, the reliability value $\sigma_{\rho n}^2$ or $\sigma_{\dot{\rho}} n^2$ corresponding to the strong but wrong measurement is fed directly to the Kalman Filter 30. As a result, the filter 30 will be "misled" and will unknowingly accord undue the weight to the measurement $\rho_n$ or $\dot{\rho}_n$ based on its high reliability. The upshot of this are undesirable discontinuities in the resultant data which, here, are the position and velocity estimates that make their way, for example, to a graphic display.

Figure 2:
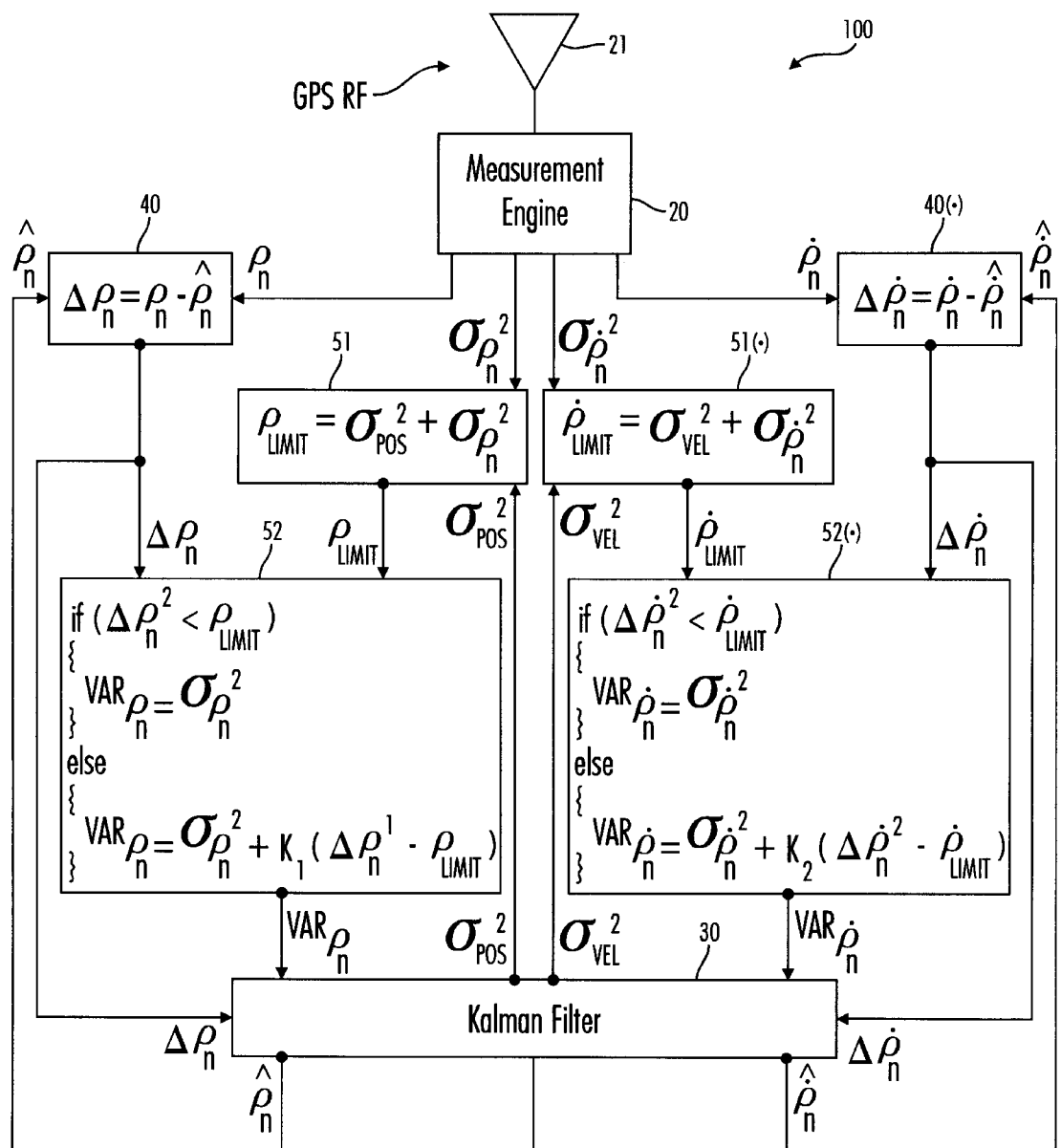
FIG. 2 is a simplified block diagram of a SATPS receiver having a Kalman Filter and which implements the reliability modification method of the present invention.

FIG. 2 is a simplified block diagram of a Kalman Filter system which implements a smoothing method in accordance with the present invention. In the context of a GPS receiver 100, as shown, the present invention is independently implemented with respect to data pairs for both position and velocity. It is only necessary to understand one to appreciate the merits of this invention, but both implementations are shown and described in detail in order to paint a complete picture.

The GPS receiver 100 of FIG. 2 has a measurement engine 20, a Kalman Filter 30, and residual calculation blocks 40, 40(·) like the conventional receiver 10 of FIG. 1. In addition, however, the GPS receiver 100 includes an envelope establishment block 51 and a reliability adjustment block 52 on the position side (left) and similar envelope establishment and reliability adjustment blocks 51(·), 52(·) on the velocity side (right). The blocks 51, 52, 51(·), 52(·) are interposed between the engine 20 and the filter 30 so as to modify the incoming reliability values $\sigma_{\rho n}^2$, $\sigma_{\dot\rho} n^2$ under certain conditions. The blocks 51, 52, 51(·), 52(·) may be physical components of one type or other, but are better viewed in a figurative or conceptual light since they are likely to be implemented in firmware along with the Kalman Filter 30.

The present invention uses the reliability adjustment blocks to uniquely take advantage of the Kalman Filter's production of overall uncertainty estimates $\sigma_{POS}^2$, $\sigma_{VEL}^2$ for its current position and velocity states, $(\hat{x}\ \hat{y}\ \hat{z})$, $(\hat{\dot x}\ \hat{\dot y}\ \hat{\dot z})$.

More particularly, in accordance with the invention, the Kalman Filter's overall uncertainty estimates $\sigma_{POS}^2$ and $\sigma_{VEL}^2$ for its position and velocity states are provided to the envelope establishment blocks 51, 51(·), respectively, which also receive the incoming reliability estimates $\sigma_{\rho n}^2$, $\sigma_{\dot\rho} n^2$ from the measurement engine 20. Based on these two values, the envelope establishment blocks 51, 51(·)compute envelopes or limit values $\rho_{LIMIT}$, $\dot\rho_{LIMIT}$, respectively, where:

$\rho_{LIMIT}=\sigma_{POS}^2+\sigma_{\rho n}^2$ in block 51; and $\dot\rho_{LIMIT}=\sigma_{VEL}^2+\sigma_{\dot\rho n}^2$ in block 51(·)

The limit values $\rho_{LIMIT}$, $\dot\rho_{LIMIT}$ from the respective envelope establishment blocks 51, 51(·) are then provided to the reliability adjustment blocks 52, 52(·), along with the corresponding residuals $\Delta\rho_n$, $\Delta\dot\rho_n$. Using these two values, the reliability adjustment blocks 52, 52(·) may, or may not, de-weight the reliability values $\sigma_{\rho n}^2$, $\sigma_{\dot\rho} n^2$ coming from the Measurement engine before passing them to the Kalman Filter 30 as modified reliability values $VAR_{\rho n}$, $VAR_{\dot\rho}n$.

In the preferred embodiment, the reliability adjustment blocks 52, 52(·) make the threshold decision of whether or not to deweight the incoming reliability values $\sigma_{\rho n}^2$, $\sigma_{\dot\rho} n^2$ based on a comparison between the square of the residual values $\Delta\rho_n^2$, $\Delta\dot\rho n^2$ and the limit values $\rho_{LIMIT}$, $\dot\rho_{LIMIT}$. As shown in FIG. 2, focusing only on the position side for the moment, the decision is preferably implemented with standard IF-THEN-ELSE logic such that if the squared residual value $\Delta\rho_n^2$ is inside of the envelope defined by the limit value $\rho_{LIMIT}$, then the "modified" reliability value $VAR_{\rho n}$ is not actually modified at all, i.e. $VAR_{\rho n}=\sigma_{\rho n}^2$, the same value that would have been passed directly from the measurement engine 20 to the Kalman Filter 30 in the conventional system of FIG. 1. By contrast, however, if the squared residual value $\Delta\rho_n^2$ is at or outside of the envelope defined by the limit value $\rho_{LIMIT}$, then the modified reliability value $VAR_{\rho n}$ is modified such that:

$VAR_{\rho n}=\sigma_{\rho n}^2+k_1(\Delta\rho_n^2-\rho_{LIMIT})$

The modified reliability value $VAR_{\rho n}$, in other words, is increased in proportion ($k_1$) to the amount by which the squared residual value $\Delta\rho_n^2$ is at or outside of the envelope defined by the limit value $\rho_{LIMIT}$. Although there may be analytical methods, the value of the scaling factor ($k_1$) may be empirically determined so as to maximize system performance with respect to some desired criteria (e.g. smooth groundtracks under varying conditions).

The result of this innovation is that the system uniquely de-weights the reliability of the current pseudoranges $\rho_n$ and pseudorange rates $\dot\rho_n$ based on the extent, if at all, to which their residuals, squared, fall outside of "envelopes" $\rho_{LIMIT}$, $\dot\rho_{LIMIT}$ that are continuously enlarged or reduced on the basis of the uncertainty estimates $\sigma_{POS}^2$, $\sigma_{VEL}^2$ of the current position and velocity states $(\hat{x}\ \hat{y}\ \hat{z})$, $(\hat{\dot x}\ \hat{\dot y}\ \hat{\dot z})$ in the Kalman Filter 30 and based on the reliability $\sigma_{\rho n}^2$, $\sigma_{\dot\rho}n^2$ of the current measurements coming from the measurement engine 20.

Significantly, the pseudoranges and pseudorange rates $\rho_n$, $\dot\rho_n$ are never ignored, just deweighted. This permits measurements that appear "implausible," but are nonetheless correct, to eventually affect the position and velocity states $(\hat{x}\ \hat{y}\ \hat{z})$, $(\hat{\dot x}\ \hat{\dot y}\ \hat{\dot z})$ via the operation of the Kalman Filter.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A method of smoothing discontinuities in a series of resultant states in a system of the type that uses a Kalman Filter to statistically derive the resultant states along with corresponding uncertainty estimates based on a succession of incoming data pairs comprising measurement values and corresponding reliability estimates which the Kalman Filter uses in order to establish a weight for the measurement value, the method comprising the steps of:

establishing a limit value based on the uncertainty estimate of the resultant state;

comparing a first comparison value based on the measurement value with a second comparison value based on the limit value;

setting a modified reliability value if the first comparison value is greater than the second comparison value; and providing the modified reliability value to the Kalman Filter in lieu of the reliability estimate in order to de-weight the corresponding measurement value.

2. The method of claim 1 wherein the modified reliability value is equal to the reliability estimate plus a scaled portion of the amount by which the first comparison value exceeds the second comparison value if the first comparison value is greater than the second comparison value.

3. The method of claim 2 wherein the scaled portion used in the setting step is determine empirically in order to maximize a desired system function.

4. The method of claim 1 wherein the step of establishing a limit value is also based on the reliability estimate of the measurement value.

5. The method of claim 4 wherein the uncertainty estimate and the reliability estimate are squared standard deviations and wherein the limit value is the sum of the squared standard deviations.

6. The method of claim 1 wherein the first comparison value is the square of a residual value corresponding to the difference between the measurement value and an a priori estimate of the measurement value provided by the Kalman Filter and wherein the second comparison value is the limit value.

7. The method of claim 1 further comprising the step of providing the reliability estimate to the Kalman Filter without modification if the first comparison value is less than the second comparison value such that the Kalman Filter gives the corresponding measurement value its natural weight.

8. The method of claim 1 wherein the resultant states are position estimates in a satellite based positioning system.

9. The method of claim I wherein the resultant states are velocity estimates in a satellite based positioning system.

10. A method of smoothing discontinuities in a series of resultant states in a satellite based positioning system that uses a Kalman Filter to statistically derive the resultant states along with corresponding uncertainty estimates based on a succession of incoming data pairs comprising pseudoranges and corresponding reliability estimates which the Kalman Filter uses in order to establish a weight for the pseudoranges, the method comprising the steps of:

establishing a limit value based on the uncertainty estimate of the resultant state and the reliability estimate of the pseudorange;

comparing a first comparison value based on the pseudorange with a second comparison value based on the limit value;

setting a modified reliability value if the first comparison value is greater than the second comparison value; and providing the modified reliability value to the Kalman Filter in lieu of the reliability estimate in order to de-weight the corresponding pseudorange.

11. The method of claim 10 wherein the modified reliability value is equal to the reliability estimate plus a scaled portion of the amount by which the first comparison value exceeds the second comparison value.

12. The method of claim 11 wherein the scaled portion used in the setting step is determine empirically in order to maximize a desired system function.

13. The method of claim 10 wherein the uncertainty estimate and the reliability estimate are squared standard deviations and wherein the limit value is the sum of the squared standard deviations.

14. The method of claim 10 wherein the first comparison value is the square of a residual value corresponding to the difference between the pseudorange and an a priori estimate of the pseudorange provided by the Kalman Filter and wherein the second comparison value is the limit value.

15. The method of claim 10 further comprising the step of providing the reliability estimate to the Kalman Filter without modification if the first comparison value is less than the second comparison value such that the Kalman Filter gives the corresponding pseudorange its natural weight.

16. The method of claim 10 wherein the resultant states are position estimates.

17. The method of claim 10 wherein the resultant states are velocity estimates.

18. An improved satellite based positioning system receiver having a Kalman Filter that statistically derives a succession of position states along with corresponding uncertainty estimates based on a succession of incoming pseudoranges and corresponding reliability estimates which the Kalman Filter uses in order to establish a weight for the pseudoranges, the improvement comprising:

means for establishing a limit value based on the uncertainty estimate of the position state and the reliability estimate of the pseudorange;

means for comparing a first comparison value based on the pseudorange with a second comparison value based on the limit value;

means for setting a modified reliability value if the first comparison value is greater than the second comparison value; and means for providing the modified reliability value to the Kalman Filter in lieu of the reliability estimate in order to de-weight the corresponding pseudorange.

19. The improved satellite based positioning system receiver of claim 18 wherein the modified reliability value is equal to the reliability estimate plus a scaled portion of the amount by which the first comparison value exceeds the second comparison value.

20. The improved satellite based positioning system receiver of claim 19 wherein the scaled portion used by the means for setting is an empirically determined value that maximizes a desired system function.

21. The improved satellite based positioning system receiver of claim 18 wherein the uncertainty estimate and the reliability estimate are squared standard deviations and wherein the limit value is the sum of the squared standard deviations.

22. The improved satellite based positioning system receiver of claim 18 wherein the first comparison value is the square of a residual value corresponding to the difference between the pseudorange and an a priori estimate of the pseudorange provided by the Kalman Filter and wherein the second comparison value is the limit value.

23. The improved satellite based positioning system receiver of claim 18 further comprising means for providing the reliability estimate to the Kalman Filter without modification if the first comparison value is less than the second comparison value such that the Kalman Filter gives the corresponding pseudorange its natural weight.

24. A method of smoothing discontinuities in position estimate solutions in a satellite positioning system (SATPS) receiver that receives a plurality of SATPS signals from a plurality of satellites and uses a Kalman Filter to update a current position estimate ($\hat{x}$ $\hat{y}$ $\hat{z}$), the method comprising the steps of:

determining a new pseudorange $\rho_n$ and a corresponding new standard deviation $\sigma_{\rho n}$ based on the SATPS signal from an $n^{th}$ one of the plurality of satellites;

calculating a measurement residual $\Delta\rho_n$ between the new pseudorange $\rho_n$ and an a priori pseudorange estimate $\hat{\rho}_n$ received from the Kalman Filter;

calculating a pseudorange limit $\rho_{LIMIT}$ by adding a variance of the current position estimate $\sigma_{POS}^2$ to a variance of the new pseudorange $\sigma_{\rho n}^2$;

comparing the square of the measurement residual $\Delta\rho_n^2$ to the square of the pseudorange limit $\rho_{LIMIT}$ which defines a permissible value envelope and, if the square of the measurement residual $\Delta\rho_n^2$ is within the permissible value envelope defined by the pseudorange limit $\Sigma_{LIMIT}$, setting a variably weighted variance value $VAR_{\rho n}$ for use with the new pseudorange $\rho_n$ equal to the variance of the new pseudorange $\sigma_{\rho n}^2$ and, if the square of the measurement residual $\Delta\rho_n^2$ exceeds the permissible value envelope defined by the pseudorange limit $\rho_{LIMIT}$, de-weighting the effect of the new pseudorange $\rho_n$ without ignoring it altogether, by setting the variably weighted variance value $VAR_{\rho n}$ for use with the new pseudorange $\rho_n$ equal to the standard deviation of the new pseudorange $\sigma_{\rho n}$ plus a scaling constant "K" times the difference between the measurement residual $\Delta\rho_n$ and the pseudorange limit $\rho_{LIMIT}$; and filtering the measurement residual $\Delta\rho_n$ and the variably weighted variance value $VAR_{\rho n}$ with the Kalman Filter to produce a next position estimate ($\hat{x}$ $\hat{y}$ $\hat{z}$), a standard deviation of the next position estimate $\sigma_{POS}$, and a next a priori pseudorange estimate $\hat{\rho}_n$ for use in acting upon and potentially de-weighting the effect of a next pseudorange $\rho_n$ and a corresponding standard deviation $\sigma_{\rho n}$ from the $n^{th}$ one of the plurality of satellites.

25. The method of claim 24 comprising the further step of displaying the position estimate solutions on a display as groundtracks.

26. The method of claim 24 wherein the scaling constant "K" is determine empirically in order to maximize a desired system function.

* * * * *